(12) United States Patent
Kang et al.

(10) Patent No.: US 11,572,010 B2
(45) Date of Patent: Feb. 7, 2023

(54) VEHICLE HEADLAMP MOUNTING ASSEMBLY AND VEHICLE

(71) Applicant: NIO TECHNOLOGY (ANHUI) CO., LTD, Hefei (CN)

(72) Inventors: Xueyun Kang, Shanghai (CN); Xuekai Shen, Shanghai (CN); Dongting Wang, Shanghai (CN); Xiaoli Liu, Shanghai (CN); Wenjun Song, Shanghai (CN); Jun Tao, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/570,589

(22) Filed: Jan. 7, 2022

(65) Prior Publication Data
US 2022/0219597 A1 Jul. 14, 2022

(30) Foreign Application Priority Data

Jan. 8, 2021 (CN) .......................... 202110023797.7

(51) Int. Cl.
*B60Q 1/04* (2006.01)

(52) U.S. Cl.
CPC ......... *B60Q 1/0433* (2013.01); *B60Q 1/0408* (2013.01); *B60Q 2200/36* (2013.01)

(58) Field of Classification Search
CPC ... B60Q 1/0408; B60Q 1/0433; B60Q 1/0483
See application file for complete search history.

(56) References Cited

U.S. PATENT DOCUMENTS

| 7,014,257 B2 * | 3/2006 | Lazzeroni | B62D 25/084 |
| | | | 296/203.02 |
| 8,567,853 B2 * | 10/2013 | Huber | B60R 19/24 |
| | | | 293/120 |

* cited by examiner

*Primary Examiner* — Robert J May
(74) *Attorney, Agent, or Firm* — Sheridan Ross P.C.

(57) ABSTRACT

The invention belongs to the technical field of vehicles, and aims to provide a headlamp mounting structure which can achieve a trade-off between the "weakness" for pedestrian safety and protection and the "strength" for durability, impact resistance and modal parameters. To this end, the invention provides a vehicle headlamp mounting assembly and a vehicle. The vehicle headlamp mounting assembly includes an upper mounting bracket, a middle mounting bracket, a lower mounting bracket, a fender bracket, a connecting plate, and a reinforcing bracket. A bottom end of the reinforcing bracket is connected to the lower mounting bracket via at least one blind rivet. A first mounting structure is provided near an inner end of the upper mounting bracket. The fender bracket is provided with a second mounting structure. A third mounting structure is provided near the bottom end of the middle mounting bracket. A fourth mounting structure is provided near the bottom end of the reinforcing bracket. When assembled, an upper part of a headlamp is fixed via the first mounting structure and the second mounting structure, and a lower part of the headlamp is fixed via the third mounting structure and the fourth mounting structure.

10 Claims, 4 Drawing Sheets

VEHICLE HEADLAMP MOUNTING ASSEMBLY AND VEHICLE

CROSS-REFERENCE TO RELATED APPLICATION

This application claims the benefit of Chinese Patent Application No. 202110023797.7 filed Jan. 8, 2021, the entire contents of which are incorporated herein by reference in its entirety.

TECHNICAL FIELD

The invention belongs to the technical field of vehicles, and particularly provides a vehicle headlamp mounting assembly and a vehicle.

BACKGROUND ART

A headlamp (also called a headlight) is a lighting device mounted on either side of the front of a vehicle to illuminate the road ahead for traveling during darkness. The headlamp can be mounted with a headlamp mounting assembly. Under the new pedestrian protection regulations, higher requirements are set for mounting structures of headlamps. Specifically, in order to protect pedestrians, after a collision in a headlamp area, the mounting structure of the headlamp needs to be easily collapsed or displaced, that is, the mounting structure of the headlamp needs to be "weak"; meanwhile, in terms of modal parameters, durability, and impact resistance of the headlamp, the headlamp need to maintain sufficient rigidity under external excitation, that is, the mounting structure of the headlamp needs to be "strong". Therefore, the difficulty of the design lies in achieving a trade-off between the "weakness" for pedestrian safety and protection and the "strength" for durability, impact resistance and modal parameters.

Accordingly, there is a need in the field for a novel vehicle headlamp mounting assembly and a vehicle to solve the above problem.

SUMMARY OF THE INVENTION

In order to solve the above-mentioned problem in the prior art, that is, to provide a headlamp mounting structure which can achieve a trade-off between the "weakness" for pedestrian safety and protection and the "strength" for durability, impact resistance and modal parameters, the present invention provides a vehicle headlamp mounting assembly, which includes an upper mounting bracket, a middle mounting bracket, a lower mounting bracket, a fender bracket, a connecting plate, and a reinforcing bracket, wherein the lower mounting bracket is connected to a front longitudinal beam of a vehicle; the fender bracket is connected to a fender of the vehicle; a top end of the middle mounting bracket is connected to the upper mounting bracket, and a bottom end of the middle mounting bracket is connected to the lower mounting bracket; a rear end of the upper mounting bracket is connected to a top end of the reinforcing bracket via the fender bracket and the connecting plate in sequence; a bottom end of the reinforcing bracket is connected to the lower mounting bracket via at least one blind rivet; the fender bracket, the connecting plate and the reinforcing bracket are all arranged on an outer side relative to the middle mounting bracket; a first mounting structure is provided near an inner end of the upper mounting bracket; the fender bracket is provided with a second mounting structure; a third mounting structure is provided near the bottom end of the middle mounting bracket; a fourth mounting structure is provided near the bottom end of the reinforcing bracket; and when assembled, an upper part of a headlamp is fixed via the first mounting structure and the second mounting structure, and a lower part of the headlamp is fixed via the third mounting structure and the fourth mounting structure.

In a preferred technical scheme of the above vehicle headlamp mounting assembly, there are a plurality of the blind rivets, and the plurality of the blind rivets are sequentially arranged in a transverse direction on the lower mounting bracket.

In a preferred technical scheme of the above vehicle headlamp mounting assembly, there are two of the blind rivets, one of which connects an inner side of the bottom end of the reinforcing bracket to the lower mounting bracket, and the other of which connects an outer side of the bottom end of the reinforcing bracket to the lower mounting bracket.

In a preferred technical scheme of the above headlamp mounting assembly, the upper mounting bracket is of a strip-like structure, and the upper mounting bracket extends outward gradually from front to rear.

In a preferred technical scheme of the above vehicle headlamp mounting assembly, the connecting plate and the reinforcing bracket are both of a strip-like structure, a bottom end of the connecting plate is connected to the top end of the reinforcing bracket via a plurality of bolts, and a top side of the reinforcing bracket and a top side of the connecting plate are both backwardly inclined.

In a preferred technical scheme of the above vehicle headlamp mounting assembly, an inner end of the upper mounting bracket is connected to a water tank crossmember of the vehicle, and an inner side of the middle mounting bracket is connected to a water tank column of the vehicle.

In a preferred technical scheme of the above vehicle headlamp mounting assembly, the inner side of the middle mounting bracket is provided with a plurality of tab structures extending forward or backward; the plurality of tab structures are sequentially arranged in a height direction of the middle mounting bracket, with each tab structure connected to the water tank column via a bolt; and when assembled, an inner side face of each tab structure is attached to an outer surface of the water tank column.

In a preferred technical scheme of the above vehicle headlamp mounting assembly, the lower mounting bracket is connected to a front crash management system of the vehicle via a connecting bracket.

In a preferred technical scheme of the above vehicle headlamp mounting assembly, the first mounting structure is positioned lower than the second mounting structure, and the third mounting structure is positioned higher than the fourth mounting structure; the first mounting structure is arranged closer to a vertical plane of symmetry of the vehicle compared with the third mounting structure, the third mounting structure is arranged closer to the vertical plane of symmetry of the vehicle compared with the second mounting structure, and the second mounting structure is arranged closer to the vertical plane of symmetry of the vehicle compared with the fourth mounting structure; and in a longitudinal direction of the vehicle, the third mounting structure and the fourth mounting structure are both located between the first mounting structure and the second mounting structure.

In a further aspect, the invention also provides a vehicle, which includes the above vehicle headlamp mounting assembly.

Those skilled in the art can understand that in the preferred technical schemes of the invention, the overall connection strength of the headlamp mounting assembly can be ensured through the connection of various components of the headlamp mounting assembly, so as to meet requirements with regard to modal parameters, durability and impact resistance, and in addition, the first mounting structure, the second mounting structure, the third mounting structure and the fourth mounting structure are separately arranged on four different components of the headlamp mounting assembly, so that deformation due to stress concentration on one single component can be prevented, that is, meeting the requirement of being "strong"; in the case of a vehicle-pedestrian collision, the headlamp will be partially displaced and the blind rivets provided will break under shear forces, so that the reinforcing bracket will be displaced backward, and also, mounting corners of the headlamp connected to the first mounting structure and the second mounting structure will also be broken, thus ensuring the overall displacement of the headlamp for pedestrian protection with the displacement generated when the headlamp collides with a pedestrian, that is, meeting the requirement of being "weak".

LIST OF REFERENCE NUMERALS

Figure 1:
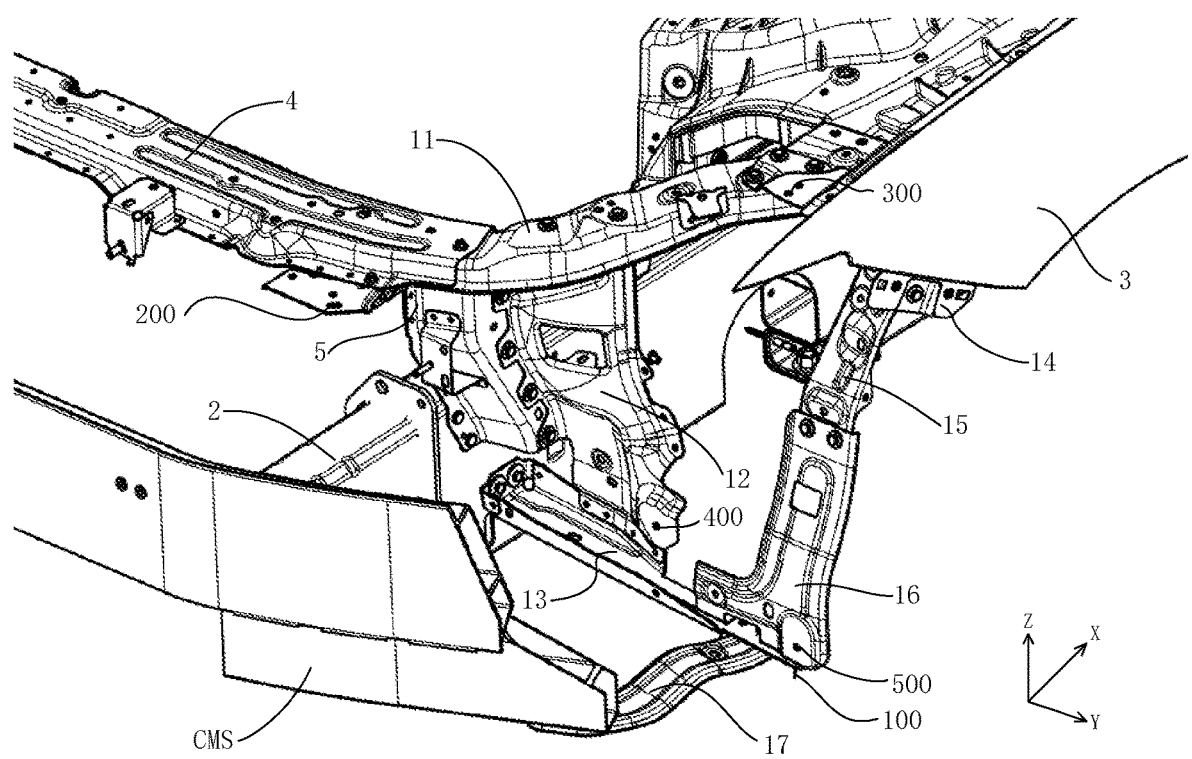
FIG. 1 is a first schematic view of a part of a vehicle of the invention.
Figure 2:
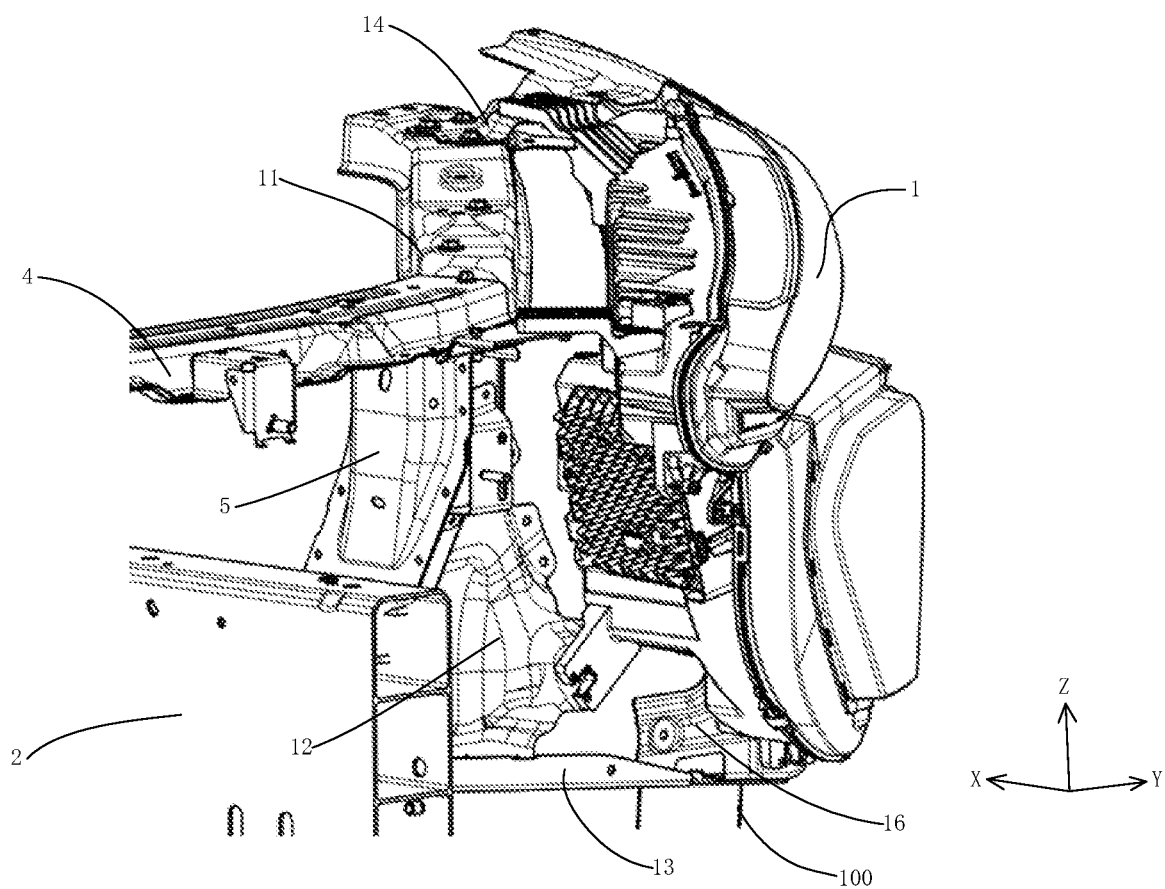
FIG. 2 is a second schematic view of a part of a vehicle of the invention.

1. Headlamp; 2. Front longitudinal beam; 3. Fender; 4. Water tank crossmember; 5. Water tank column; 11. Upper mounting bracket; 12. Middle mounting bracket; 13. Lower mounting bracket; 14. Fender bracket; 15. Connecting plate; 16. Reinforcing bracket; 17. Connecting bracket; 100. Blind rivet; 200. First mounting structure; 300. Second mounting structure; 400. Third mounting structure; 500. Fourth mounting structure.

DETAILED DESCRIPTION OF EMBODIMENTS

Preferred embodiments of the invention are described below with reference to the drawings. It should be understood by those skilled in the art that these embodiments are only for explaining the technical principles of the invention and are not intended to limit the scope of protection of the invention.

It should be noted that, in the description of the invention, the terms that indicate the direction or positional relationship, such as "middle", "upper", "lower", "left", "right", "front", "rear", "transverse", "longitudinal", "inner", and "outer" are based on the direction or positional relationship shown in the figures, which is merely for ease of description instead of indicating or implying that the device or element must have a particular orientation and be constructed and operated in a particular orientation, and therefore, should not be construed as limiting the invention. In addition, the terms "first", "second", "third", and "fourth" are for descriptive purposes only and should not be construed as indicating or implying relative importance.

In addition, it should also be noted that, in the description of the invention, the terms "mount", "provide" and "connect" should be interpreted in a broad sense unless explicitly defined and limited otherwise, which, for example, may mean a fixed connection, a detachable connection or an integral connection; may mean a mechanical connection, and may mean a direct connection, an indirect connection by means of an intermediary, or internal communication between two elements. For those skilled in the art, the specific meaning of the above-mentioned terms in the invention can be interpreted according to the specific situation.

Based on the need noted in the Background Art to provide a headlamp mounting structure which can achieve a trade-off between the "weakness" for pedestrian safety and protection and the "strength" for durability, impact resistance and modal parameters, the invention provides a vehicle headlamp mounting assembly and a vehicle, aiming at being able to meet requirements with regard to modal parameters, durability and impact resistance as well as enabling the headlamp to displace during a vehicle-pedestrian collision for pedestrian protection.

It should be noted that in the description of the invention, "longitudinal" refers to the front-rear direction, that is, corresponding to the direction along the X-axis of the standard vehicle coordinate system; "transverse" refers to the lateral direction, that is, corresponding to the direction along the Y-axis of the standard vehicle coordinate system; the vertical direction corresponds to the direction along the Z-axis of the standard vehicle coordinate system; and "front" refers to the direction toward the front of the vehicle, and "rear" refers to the direction toward the rear of the vehicle.

As shown in FIGS. 1-4, the vehicle of the invention includes a headlamp 1, a front longitudinal beam 2, a fender 3 and a headlamp mounting assembly. The vehicle headlamp mounting assembly includes an upper mounting bracket 11, a middle mounting bracket 12, a lower mounting bracket 13, a fender bracket 14, a connecting plate 15, and a reinforcing bracket 16. The lower mounting bracket 13 is connected to the front longitudinal beam 2. The fender bracket 14 is connected to the fender 3. A top end of the middle mounting bracket 12 is connected to the upper mounting bracket 11, and a bottom end of the middle mounting bracket 12 is connected to the lower mounting bracket 13. A rear end of the upper mounting bracket 11 is connected to a top end of the reinforcing bracket 16 via the fender bracket 14 and the connecting plate 15 in sequence. A bottom end of the reinforcing bracket 16 is connected to the lower mounting bracket 13 via at least one blind rivet 100. The fender bracket 14, the connecting plate 15 and the reinforcing bracket 16 are all arranged on an outer side relative to the middle mounting bracket 12. A first mounting structure 200 is provided near an inner end of the upper mounting bracket 11. The fender bracket 14 is provided with a second mounting structure 300. A third mounting structure 400 is provided near the bottom end of the middle mounting bracket 12. A fourth mounting structure 500 is provided near the bottom end of the reinforcing bracket 16. When assembled, an upper part of the headlamp 1 is fixed via the first mounting structure 200 and the second mounting structure 300, and a lower part of the headlamp 1 is fixed via the third mounting structure 400 and the fourth mounting structure 500.

Figure 3:
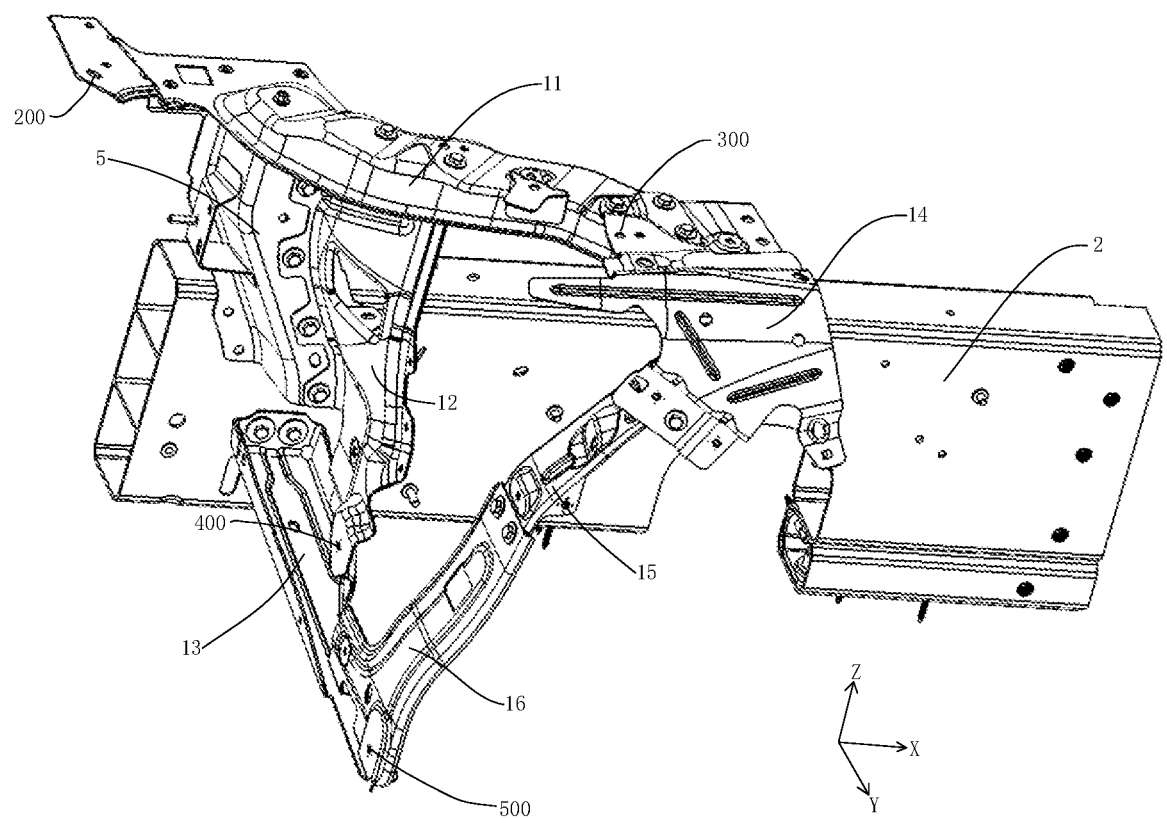
FIG. 3 is a third schematic view of a part of a vehicle of the invention.
Figure 4:
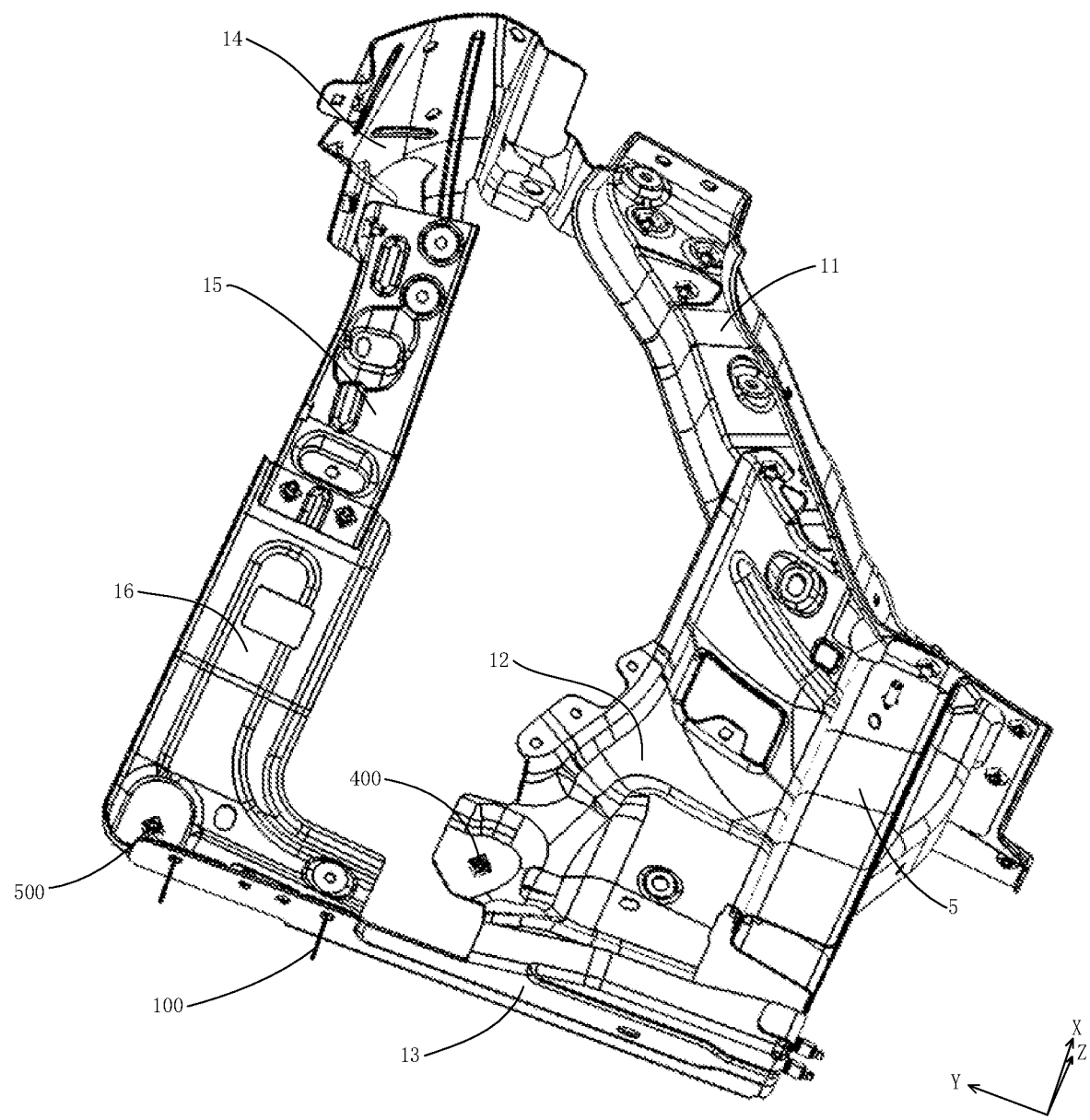
FIG. 4 is a schematic view of a headlamp mounting assembly of the invention.

It should be noted that the lower mounting bracket 13 may be connected to the front longitudinal beam 2 by bolts, rivets, or a combination thereof, which can be flexibly configured by those of skill in the art. For example, in the structure shown in FIGS. 1 and 3, the lower mounting bracket 13 is connected to the front longitudinal beam 2 by two bolts arranged in the longitudinal direction. The fender bracket 14 may be connected to the fender 3 by bolts, rivets, or a combination thereof, which can be flexibly configured by those of skill in the art. For example, in the structure shown in FIG. 1, the fender bracket 14 and the fender 3 are connected by two bolts arranged generally in the longitudinal direction. The top end of the middle mounting bracket 12 may be connected to the upper mounting bracket 11 by bolts, rivets, or a combination thereof, which can be flexibly configured by those of skill in the art. For example, in the structure shown in FIG. 4, the top end of the middle mounting bracket 12 is connected to the upper mounting bracket 11 by two bolts arranged generally in the lateral direction. In a specific embodiment, the top end of the middle mounting bracket 12 is provided with two bends, each of which is connected to the upper mounting bracket 11 by a bolt. The bottom end of the middle mounting bracket 12 may be connected to the lower mounting bracket 13 by welding or other connection means, or a combination thereof, which can be flexibly configured by those of skill in the art. In one possible embodiment, the bottom end of the middle mounting bracket 12 is welded to the lower mounting bracket 13 by four welding points arranged generally in the lateral direction. The rear end of the upper mounting bracket 11 may be connected to the fender bracket 14 by bolts, rivets, or a combination thereof, which can be flexibly configured by those of skill in the art. For example, in the structure shown in FIGS. 1 and 3, the rear end of the upper mounting bracket 11 is connected to the fender 3 by three bolts which are generally arranged in the XY plane and in a triangle shape, so as to ensure the strength and stability of the connection. The fender bracket 14 may be connected to the connecting plate 15 by bolts, rivets, or a combination thereof, which can be flexibly configured by those of skill in the art. For example, in the structure shown in FIG. 4, the fender bracket 14 and the connecting plate 15 are connected by a bolt. In a specific embodiment, one side of the connecting plate 15 close to the fender bracket 14 is provided with a bend which is connected to the fender bracket 14 by a bolt. The connecting plate 15 may be connected to the top end of the reinforcing bracket 16 by bolts, rivets, or a combination thereof, which can be flexibly configured by those of skill in the art. For example, in the structures shown in FIGS. 1, 2 and 4, the connecting plate 15 and the top end of the reinforcing bracket 16 are connected by two bolts arranged in the lateral direction. The bottom end of the reinforcing bracket 16 is connected to the lower mounting bracket 13 by at least one blind rivet 100, either by one blind rivet 100 or by a plurality of blind rivets 100. In one possible embodiment, there are a plurality of the blind rivets 100, and the plurality of the blind rivets 100 are sequentially arranged on the lower mounting bracket 13 in the transverse direction, that is, the bottom end of the reinforcing bracket 16 and the lower mounting bracket 13 are connected by a plurality of blind rivets 100 arranged in the lateral direction. When there are at least three of the blind rivets 100, they can be arranged at regular or irregular intervals, which can be flexibly configured by those skilled in the art according to the actual spatial arrangement and overall strength requirements. In a specific embodiment, as shown in FIGS. 1 and 4, there are two of the blind rivets 100, where one of the two blind rivets 100 connects an inner side of the bottom end of the reinforcing bracket 16 to the lower mounting bracket 13, and the other of the two blind rivets 100 connects an outer side of the bottom end of the reinforcing bracket 16 to the lower mounting bracket 13.

It should be further explained that, compared with connecting the inner side of the bottom end of the reinforcing bracket 16 to the lower mounting bracket 13 by a bolt, it is easier to meet the requirement of "weakness" of the headlamp mounting assembly by using the blind rivet 100 to connect the inner side of the bottom end of the reinforcing bracket 16 to the lower mounting bracket 13 according to the invention, that is, after a collision in the area of the headlamp 1, the impact force can cause the breakage of the blind rivet 100, so that the headlamp 1 can be displaced. Moreover, compared with connecting the inner side of the bottom end of the reinforcing bracket 16 to the lower mounting bracket 13 by clamping, the blind rivet 100 used in the invention to connect the inner side of the bottom end of the reinforcing bracket 16 to the lower mounting bracket 13 can meet the requirements of the connection strength, and moreover, it is not prone to looseness under external excitation.

In a possible embodiment, as shown in FIGS. 1-4, the headlamp 1 is connected, via two upper mounting corners separately, to the first mounting structure 200 and the second mounting structure 300. The upper mounting corners may adopt a U-shaped structure, while the first mounting structure 200 and the second mounting structure 300 may be provided with screw holes which can be connected to the slot of the U-shaped structure by bolts. Likewise, the headlamp 1 is also connected, via two lower mounting corners separately, to the third mounting structure 400 and the fourth mounting structure 500. The lower mounting corners may also adopt a U-shaped structure, while the third mounting structure 400 and the fourth mounting structure 500 may be provided with screw holes which can be connected to the slot of the U-shaped structure by bolts. One blind rivet 100 connects the inner side of the bottom end of the reinforcing bracket 16 to the lower mounting bracket 13, and another blind rivet 100 connects the outer side of the bottom end of the reinforcing bracket 16 to the lower mounting bracket 13. When a collision occurs in the area of the headlamp 1, a front part of the headlamp 1 is subject to an impact force generated when colliding with the pedestrian. The impact force acts backward and is partially transmitted to the position of the blind rivets 100 through the headlamp 1, so that the two blind rivets 100 on the inner side and outer side of the bottom end of the reinforcing bracket 16 are broken by shear forces, thus ensuring the displacement of the lower part of the headlamp 1. The impact force acts backward and is partially transmitted to the two upper mounting corners of the headlamp 1, which leads to breakage of both upper mounting corners, thus ensuring the displacement of the upper part of the headlamp 1. Preferably, the middle mounting bracket 12 can be partially weakened. For example, a cantilever structure is arranged along the Y-axis at the position of the third mounting structure 400 on the middle mounting bracket 12, so as to ensure that the middle mounting bracket 12 can be deformed backward when the headlamp 1 is impacted, thus ensuring that the lower mounting corner connected to the third mounting structure 400 can also be displaced backward, thereby enabling the overall displacement of the headlamp 1.

Preferably, the upper mounting bracket 11 is of a strip-like structure, and the upper mounting bracket 11 extends outward gradually from front to rear. Specifically, the front end of the upper mounting bracket 11, compared with its rear end, is arranged closer to a vertical plane of symmetry of the vehicle, so as to realize an oblique arrangement of the upper mounting bracket 11. In a preferred embodiment, the plane where the upper mounting bracket 11 is located is completely or substantially in the XY plane, and the upper mounting bracket 11 may be provided with a flange and/or a reinforcing rib, so as to improve the structural strength of the upper mounting bracket 11 itself and meet the requirements with regard to its stiffness and modal parameters.

Preferably, the connecting plate 15 and the reinforcing bracket 16 are both of a strip-like structure, a bottom end of the connecting plate 15 is connected to the top end of the reinforcing bracket 16 via a plurality of bolts, and a top side of the reinforcing bracket 16 and a top side of the connecting plate 15 are both backwardly inclined. By configuring the top side of the reinforcing bracket 16 and the top side of the connecting plate 15 to be inclined backward, the reinforcing bracket 16 and the connecting plate 15 can be well adapted to the vehicle body, that is, the reinforcing bracket 16 and the connecting plate 15 can be located in a gap formed by the headlamp 1 and the fender, which facilitates the arrangement of the overall vehicle body. Moreover, both the reinforcing bracket 16 and the connecting plate 15 can be provided with a flange and/or a reinforcing rib, thereby improving the structural strength of the reinforcing bracket 16 and the connecting plate 15, and meeting the requirements with regard to their stiffness and modal parameters. Hence, a structure with robustness is formed in the gap between the headlamp 1 and the fender.

As shown in FIG. 1, the front of the vehicle is provided with a water tank crossmember 4 and a water tank column 5 which are connected to each other by bolts. The water tank crossmember 4 is used to install a water tank, while the water tank column 5 is used to support the water tank crossmember 4. The water tank column 5 is connected to the front longitudinal beam 2 by two tapping rivets which are generally arranged vertically one above another (preferably, the water tank column 5 is arranged on an outer side of the front longitudinal beam 2, thereby reducing the cantilever structure at the third and fourth mounting structures 400 and 500, and reducing the leverage effect while simplifying the structure). Of course, the tapping rivets mentioned above can also be replaced with bolts. Preferably, an inner end of the upper mounting bracket 11 is connected to the water tank crossmember 4, and an inner side of the middle mounting bracket 12 is connected to the water tank column 5. The inner end of the upper mounting bracket 11 may be connected to the water tank crossmember 4 by bolts, rivets, or a combination thereof, which can be flexibly configured by those of skill in the art. For example, in the structure shown in FIGS. 1 and 3, the inner end of the upper mounting bracket 11 is connected to the water tank crossmember 4 by four bolts. The inner side of the middle mounting bracket 12 may be connected to the water tank column 5 by bolts, rivets, or a combination thereof, which can be flexibly configured by those of skill in the art. In a preferred embodiment, as shown in FIGS. 1 and 3, the inner side of the middle mounting bracket 12 is provided with a plurality of tab structures (shown as four tab structures in the figure) extending forward or backward (all shown as extending forward in the figure). The plurality of tab structures are sequentially arranged in a height direction of the middle mounting bracket 12, with each tab structure connected to the water tank column 5 via a bolt. When assembled, an inner side face of each tab structure is attached to an outer surface of the water tank column 5, thereby improving the tightness and reliability of the connection.

Preferably, the lower mounting bracket 13 is connected to a front crash management system (CMS) of the vehicle via a connecting bracket 17. With the connecting bracket 17, the stiffness of the headlamp mounting assembly along the Z-axis and Y-axis can be improved to meet vibration test requirements.

Preferably, the first mounting structure 200 is positioned lower than the second mounting structure 300, and the third mounting structure 400 is positioned higher than the fourth mounting structure 500; the first mounting structure 200 is arranged closer to a vertical plane of symmetry of the vehicle compared with the third mounting structure 400, the third mounting structure 400 is arranged closer to the vertical plane of symmetry of the vehicle compared with the second mounting structure 300, and the second mounting structure 300 is arranged closer to the vertical plane of symmetry of the vehicle compared with the fourth mounting structure 500; and in the longitudinal direction of the vehicle, the third mounting structure 400 and the fourth mounting structure 500 are both located between the first mounting structure 200 and the second mounting structure 300. This arrangement is more conducive to improving the stability of the support to the headlamp 1. For example, when viewed along the longitudinal direction (X-axis), the mounting positions of the two mounting corners at the bottom of the headlamp 1 are located between the mounting positions of the two mounting corners at the top of the headlamp 1, so as to prevent the headlamp 1 from exerting uneven force on the headlamp mounting assembly in the longitudinal direction and influencing the overall mounting strength of the brackets of the headlamp 1. In addition, when viewed in the YZ plane, through the above arrangement, the forces supporting the headlamp mounting assembly can be concentrated more on the front longitudinal beam 2, the water tank crossmember 4 and the water tank column 5 with higher strength, thus preventing the fender 3 from being overloaded, thus meeting the overall arrangement and strength requirements of the vehicle body. In a more preferable embodiment, a center formed by the first mounting structure 200, the second mounting structure 300, the third mounting structure 400 and the fourth mounting structure 500 is close to the center of the headlamp 1 or coincides with the center of the headlamp 1, thereby increasing the stiffness and strength of the overall structure.

Thus, the technical scheme of the invention has been described with reference to the preferred embodiments shown in the accompanying drawings. However, it will be readily understood by those skilled in the art that the scope of protection of the invention is obviously not limited to these particular embodiments. Without departing from the principle of the invention, a person skilled in the art may make equivalent modifications or substitutions to related technical features, and the technical schemes after these modifications or substitutions shall fall within the protection scope of the invention.

The invention claimed is:

1. A vehicle headlamp mounting assembly, comprising: an upper mounting bracket, a middle mounting bracket, a lower mounting bracket, a fender bracket, a connecting plate, and a reinforcing bracket, wherein
the lower mounting bracket is connected to a front longitudinal beam of a vehicle; the fender bracket is connected to a fender of the vehicle; a top end of the middle mounting bracket is connected to the upper mounting bracket, and a bottom end of the middle mounting bracket is connected to the lower mounting bracket; a rear end of the upper mounting bracket is connected to a top end of the reinforcing bracket via the fender bracket and the connecting plate in sequence; a bottom end of the reinforcing bracket is connected to the lower mounting bracket via at least one blind rivet;

the fender bracket, the connecting plate and the reinforcing bracket are all arranged on an outer side relative to the middle mounting bracket; a first mounting structure is provided near an inner end of the upper mounting bracket; the fender bracket is provided with a second mounting structure; a third mounting structure is provided near the bottom end of the middle mounting bracket; a fourth mounting structure is provided near the bottom end of the reinforcing bracket; and when assembled, an upper part of a headlamp is fixed via the first mounting structure and the second mounting structure, and a lower part of the headlamp is fixed via the third mounting structure and the fourth mounting structure.

2. The vehicle headlamp mounting assembly according to claim 1, wherein there are a plurality of the blind rivets, and the plurality of the blind rivets are sequentially arranged in a transverse direction on the lower mounting bracket.

3. The vehicle headlamp mounting assembly according to claim 2, wherein there are two of the blind rivets, one of which connects an inner side of the bottom end of the reinforcing bracket to the lower mounting bracket, and the other of which connects an outer side of the bottom end of the reinforcing bracket to the lower mounting bracket.

4. The vehicle headlamp mounting assembly according to claim 1, wherein the upper mounting bracket is of a strip-like structure, and the upper mounting bracket extends outward gradually from front to rear.

5. The vehicle headlamp mounting assembly according to claim 4, wherein the connecting plate and the reinforcing bracket are both of a strip-like structure, a bottom end of the connecting plate is connected to the top end of the reinforcing bracket via a plurality of bolts, and a top side of the reinforcing bracket and a top side of the connecting plate are both backwardly inclined.

6. The vehicle headlamp mounting assembly according to claim 1, wherein an inner end of the upper mounting bracket is connected to a water tank crossmember of the vehicle, and an inner side of the middle mounting bracket is connected to a water tank column of the vehicle.

7. The vehicle headlamp mounting assembly according to claim 6, wherein the inner side of the middle mounting bracket is provided with a plurality of tab structures extending forward or backward; the plurality of tab structures are sequentially arranged in a height direction of the middle mounting bracket, with each tab structure connected to the water tank column via a bolt; and when assembled, an inner side face of each tab structure is attached to an outer surface of the water tank column.

8. The vehicle headlamp mounting assembly according to claim 1, wherein the lower mounting bracket is connected to a front crash management system of the vehicle via a connecting bracket.

9. The vehicle headlamp mounting assembly according to claim 1, wherein the first mounting structure is positioned lower than the second mounting structure, and the third mounting structure is positioned higher than the fourth mounting structure;

the first mounting structure is arranged closer to a vertical plane of symmetry of the vehicle compared with the third mounting structure, the third mounting structure is arranged closer to the vertical plane of symmetry of the vehicle compared with the second mounting structure, and the second mounting structure is arranged closer to the vertical plane of symmetry of the vehicle compared with the fourth mounting structure; and in a longitudinal direction of the vehicle, the third mounting structure and the fourth mounting structure are both located between the first mounting structure and the second mounting structure.

10. A vehicle, comprising the vehicle headlamp mounting assembly according to claim 1.

* * * * *